US012628791B1

(12) United States Patent
Xiao

(10) Patent No.: US 12,628,791 B1
(45) Date of Patent: May 19, 2026

(54) CAT LITTER SIEVING DEVICE AND CAT LITTER BOX

(71) Applicant: Xiaolong Technology (Shenzhen) Co., Ltd., Shenzhen (CN)

(72) Inventor: Peixin Xiao, Shenzhen (CN)

(73) Assignee: Xialong Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/076,427

(22) Filed: Mar. 11, 2025

(51) Int. Cl.
A01K 1/01 (2006.01)
(52) U.S. Cl.
CPC .................................. A01K 1/0114 (2013.01)
(58) Field of Classification Search
CPC .... A01K 1/011; A01K 1/0114; A01K 1/0107; A01K 1/0128; A01K 1/0132
See application file for complete search history.

(56) References Cited

U.S. PATENT DOCUMENTS

| | | | | | |
|---|---|---|---|---|---|
| 4,846,104 | A | * | 7/1989 | Pierson, Jr. | A01K 1/0114 209/235 |
| 5,662,066 | A | * | 9/1997 | Reitz | A01K 1/0114 119/163 |
| 12,075,750 | B2 | * | 9/2024 | Zhou | A01K 1/0114 |
| 2002/0139312 | A1 | * | 10/2002 | Reitz | A01K 1/0114 119/165 |
| 2011/0214614 | A1 | * | 9/2011 | Sharp | A01K 1/0107 119/166 |

| | | | | | |
|---|---|---|---|---|---|
| 2013/0333625 | A1 | * | 12/2013 | Baxter | A01K 1/011 119/166 |
| 2023/0363348 | A1 | * | 11/2023 | Pan | A01K 1/0114 |
| 2024/0114874 | A1 | * | 4/2024 | Zhang | A01K 1/0114 |
| 2024/0407320 | A1 | * | 12/2024 | Mo | A01K 1/0114 |
| 2025/0031660 | A1 | * | 1/2025 | Zhang | A01K 1/0114 |
| 2025/0057107 | A1 | * | 2/2025 | Tang | A01K 1/0114 |

FOREIGN PATENT DOCUMENTS

| | | | | | |
|---|---|---|---|---|---|
| CN | 109156367 | A | * | 1/2019 | .......... A01K 1/0114 |
| CN | 109463289 | A | * | 3/2019 | .......... A01K 1/0107 |
| CN | 110169368 | A | * | 8/2019 | |
| CN | 110810256 | A | * | 2/2020 | .......... A01K 1/0107 |
| CN | 111837972 | A | * | 10/2020 | ............ A01K 1/011 |
| CN | 111837974 | A | * | 10/2020 | |
| CN | 112075348 | A | * | 12/2020 | |
| CN | 112075349 | A | * | 12/2020 | |
| CN | 112189569 | A | * | 1/2021 | |
| CN | 212589490 | U | | 2/2021 | |

(Continued)

*Primary Examiner* — Monica L Perry
*Assistant Examiner* — Aaron M Rodziwicz

(57) ABSTRACT

A cat litter sieving device and a cat litter box. The cat litter sieving device includes: a rotatable body, a sand guide plate, and a sieving net. The rotatable body defines a storage space and a drain outlet; the sand guide plate and the sieving net divide the storage space into a sand storage cavity and a sand sieving cavity. The sand guide plate is removably connected to the rotatable body; a side of the sand guide plate away from the sieving net is disposed close to the drain outlet; a stop portion is arranged on an inner wall of the storage space, and the stop portion abuts against the side of the sand guide plate away from the sieving net to generate a blocking force, for preventing the side of the sand guide plate away from the sieving net from slipping within the storage space.

19 Claims, 9 Drawing Sheets

(56)                    References Cited

FOREIGN PATENT DOCUMENTS

| | | | | | |
|---|---|---|---|---|---|
| CN | 112470951 | A | * | 3/2021 | ........... A01K 1/0047 |
| CN | 113229153 | A | * | 8/2021 | ............ A01K 1/011 |
| CN | 114793917 | A | * | 7/2022 | |
| CN | 217038344 | U | * | 7/2022 | ........... A01K 1/0114 |
| CN | 116868899 | A | * | 10/2023 | ........... A01K 1/0114 |
| CN | 117617126 | A | * | 3/2024 | |
| CN | 220630549 | U | * | 3/2024 | ........... A01K 1/0114 |
| CN | 118370220 | A | * | 7/2024 | |
| CN | 118415083 | A | * | 8/2024 | |
| CN | 118648538 | A | * | 9/2024 | |
| CN | 118696837 | A | * | 9/2024 | |
| CN | 118716215 | A | * | 10/2024 | |
| CN | 118749436 | A | * | 10/2024 | |
| CN | 221843385 | U | * | 10/2024 | |
| CN | 221901834 | U | * | 10/2024 | |
| CN | 118947555 | A | * | 11/2024 | |
| CN | 222284249 | U | * | 1/2025 | |
| CN | 222465656 | U | * | 2/2025 | |
| CN | 119605664 | A | * | 3/2025 | |
| FR | 3148134 | A1 | * | 11/2024 | ............ A01K 1/011 |
| JP | 3244427 | U | * | 11/2023 | ........... A01K 1/0114 |
| JP | 2024527238 | A | * | 7/2024 | |
| JP | 2024159669 | A | * | 11/2024 | ............ A01K 1/011 |
| KR | 20190073048 | A | * | 6/2019 | |
| KR | 20200119093 | A | * | 10/2020 | |
| WO | WO-2020219849 | A1 | * | 10/2020 | ........... A01K 1/0052 |

* cited by examiner

200

200

CAT LITTER SIEVING DEVICE AND CAT LITTER BOX

TECHNICAL FIELD

The present disclosure relates to the technical field of pet supplies, and in particular to a cat litter sieving device and a cat litter box.

BACKGROUND

Conventionally; am existing automatic self-cleaning cat litter box with a rotating drum is arranged with a sand guide structure to screen the cat litter and clumps of cat droppings. Specifically: the self-cleaning cat litter box rotates in a certain direction, causing the cat litter that has formed a clump with the cat's waste to be discharged from a drain outlet, while the clean cat litter is retained in the cat litter box after being sieved. Since the self-cleaning cat litter box often rotates at a large angle, the sand guide structure is prone to move in the cat litter box, causing the clean cat litter to also be discharged from the drain outlet.

The above content is only intended to assist in understanding the technical solution of the present disclosure, and does not mean that the above content is admitted as prior art.

SUMMARY OF THE DISCLOSURE

In view of the above problems, the present disclosure proposes a cat litter sieving device, which is designed to solve the technical problem that the sand guide structure is prone to move in the cat litter box, causing clean cat litter to be mistakenly discharged from the drain outlet.

A cat litter sieving device, including: a rotatable body; a sand guide plate, and a sieving net; wherein the rotatable body defines a storage space and a drain outlet communicating with the storage space; the sand guide plate and the sieving net are connected to each other, cooperatively dividing the storage space into a sand storage cavity and a sand sieving cavity: the drain outlet is arranged on the sand sieving cavity, and the sieving net has a mesh structure: the sand guide plate is removably connected to the rotatable body: a side of the sand guide plate away from the sieving net is disposed close to the drain outlet: a stop portion is arranged on an inner wall of the storage space, and the stop portion abuts against the side of the sand guide plate away from the sieving net to generate a blocking force, for preventing the side of the sand guide plate away from the sieving net from slipping within the storage space.

In some embodiments, the stop portion includes a stop protrusion disposed on an inner wall of the sand storage cavity: the sand guide plate defines a stop groove on the side away from the sieving net, and the stop protrusion is engaged with the stop groove.

In some embodiments, the sand guide plate is arranged with at least two stop seats, and each of the at least two stop seats defines the stop groove: the side of the sand guide plate away from the sieving net is further arranged with a reinforcing rib disposed between each adjacent two of the at least two stop seats.

In some embodiments, the stop portion includes a limit protrusion arranged in the sand storage cavity; the drain outlet has two first edges and a second edge connecting the two first edges; each of the two first edges is arranged with the limit protrusion; the sand guide plate includes a main plate and two guide walls, the main plate having two first side edges and a second side edge connecting the two first side edges; the two guide walls are connected to the two first side edges in a one-to-one correspondence and are bent towards the sand sieving cavity; the second side edge is close to and parallel to the second edge; the two guide walls abut against the limit protrusions on the two first edges in a one-to-one correspondence.

In some embodiments, a support portion is arranged between the sand guide plate and the rotatable body; and the support portion is disposed in the sand storage cavity.

In some embodiments, the support portion includes a first support column disposed on an inner wall of the sand storage cavity and a second support column disposed on the sand guide plate; the first support column is arranged with a first magnetic member, and the second support column is arranged with a second magnetic member, the first magnetic member and the second magnetic member being capable of magnetically connected to each other.

In some embodiments, extension directions of the first support column and the second support column are parallel to an opening direction of the drain outlet, and a length of the second support column is less than a length of the first support column.

In some embodiments, the rotatable body has a sieving state and a reference line; in the sieving state, the drain outlet is disposed at a bottom of the rotatable body, and the reference line passes through a connection between the sand guide plate and the sieving net and extends in a horizontal direction; the cat litter sieving device further includes a sand storage tank arranged in the sand storage cavity; in the sieving state, the sand storage tank is disposed at least partially above the reference line, and an opening of the sand storage tank is disposed above the reference line.

In some embodiments, the sand guide plate is rotatably connected to the sieving net; a connection between the sand guide plate and the sieving net is arranged with a damping member.

A cat litter box, including a body portion and the cat litter sieving device as above; wherein the body portion is rotatably connected to the cat litter sieving device The removable connection between the sand guide plate and the rotatable body and the setting of the stop portion ensure that the sand guide plate can be removed for cleaning and will not move due to the rotation of the rotatable body.

BRIEF DESCRIPTION OF THE DRAWINGS

In order to more clearly illustrate the technical solution of the embodiments of the present disclosure, the following is a brief description of the drawings required to be used in the description of the embodiments of the present disclosure. Obviously, the drawings in the following description are only some embodiments of the present disclosure. For those skilled in the art, without the payment of creative labor, other drawings can also be obtained based on these drawings.

FIG. 5 is a cross-sectional schematic view of the cat litter sieving device along line V-V in FIG. 4: where

REFERENCE NUMERALS

Figure 1:
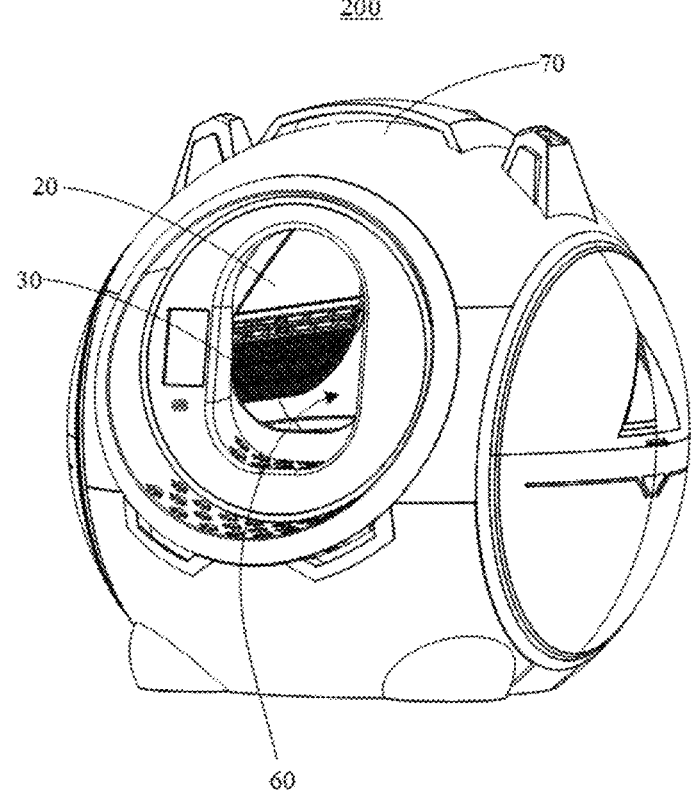
FIG. 1 is a structural schematic view of a cat litter box according to some embodiments of the present disclosure.
Figure 2:
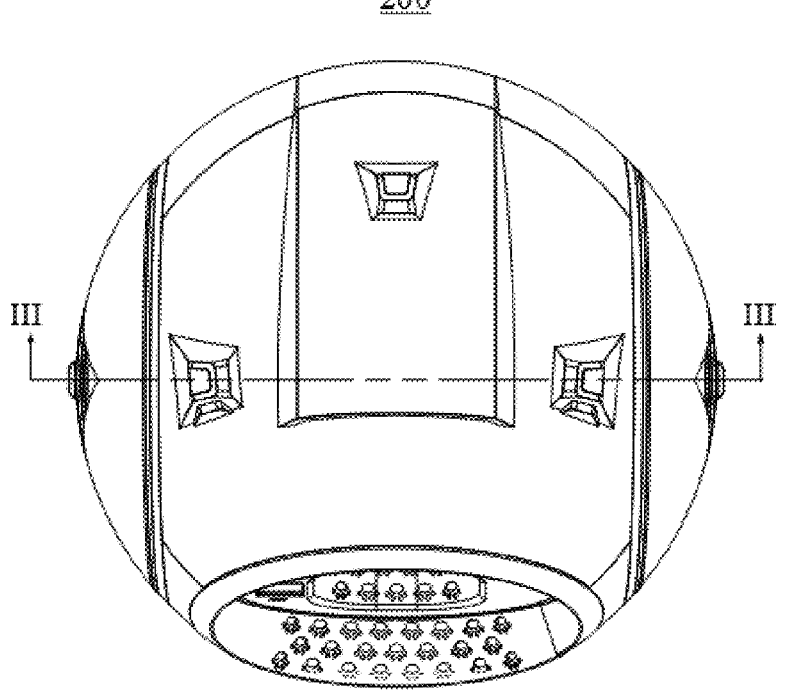
FIG. 2 is a top structural schematic view of the cat litter box in FIG. 1.

| No. | Name | No. | Name | No. | Name |
|---|---|---|---|---|---|
| 100 | cat litter sieving device | 20 | sand guide plate | 30 | sieving net |
| 10 | rotatable body | 21 | support portion | 40 | sand storage tank |
| 11 | storage space | 211 | first support column | 42 | reinforcing bar |
| 111 | sand storage cavity | 2112 | first mounting slot | 50 | rake teeth |
| 112 | sand sieving cavity | 212 | second support column | 60 | entrance |
| 1131 | stop protrusion | 22 | stop seat | 61 | first space |
| 1132 | stop groove | 23 | reinforcing rib | 62 | second space |
| 1133 | limit protrusion | 24 | guide wall | 63 | third space |
| 12 | drain outlet | 25 | baffle | 200 | cat litter box |
| 70 | body portion | 26 | main plate | 31 | first edge |
| 32 | second edge | 33 | first side edge | 34 | second side edge |
| 35 | guide bevel | 36 | limit bevel | 37 | damping member |
| 38 | first limit leg | 39 | second limit leg | | |

The realization of the purpose, functional features, and advantages of the present disclosure will be further illustrated by reference to the accompanying drawings in combination with the embodiments.

DETAILED DESCRIPTION

The following will clearly and completely describe the technical solution in the embodiments of the present disclosure in conjunction with the accompanying drawings in the embodiments of the present disclosure. Obviously, the embodiments described are only some of the embodiments of the present disclosure, not all of them. Based on the embodiments in the present disclosure, all other embodiments obtained by those skilled in the art without creative effort are within the scope of the present disclosure. In addition, the technical solutions of the embodiments may be combined with each other, but they must be based on what those skilled in the art can achieve. When the combination of technical solutions is contradictory or impossible, it should be considered that such combination of technical solutions does not exist and is not within the scope of the present disclosure.

It should be noted that when the embodiments of the present disclosure involve directional indications (such as up, down, left, right, front, back, etc.), such directional indications are only intended to explain the relative positional relationship between various components and the movement situation in a particular posture. When the particular posture changes, the directional indications will also change accordingly:

In addition, when the embodiments of the present disclosure involve descriptions such as "first" and "second", such descriptions of "first" and "second" are for descriptive purposes only and should not be construed as indicating or implying their relative importance or implying a specified number of technical features. Therefore, features that are defined as "first" or "second" may expressly or impliedly include at least one such feature. In addition, the meaning of "and/or" appearing throughout the text is to include three alternatives in parallel, for example "A and/or B", which includes alternative A, or alternative B, or both A and B.

The present disclosure proposes a cat litter sieving device 100 including a rotatable body 10, a sand guide plate 20, and a sieving net 30; the rotatable body 10 defines a storage space 11 and a drain outlet 12 communicating with the storage space 11; the sand guide plate 20 and the sieving net 30 are connected to each other, cooperatively dividing the storage space 11 into a sand storage cavity 111 and a sand sieving cavity 112; the drain outlet 12 is arranged on the sand sieving cavity 112, and the sieving net 30 has a mesh structure; the sand guide plate 20 is removably connected to the rotatable body 10; a side of the sand guide plate 20 away from the sieving net 30 is disposed close to the drain outlet 12; a stop portion is arranged on an inner wall of the storage space 11, and the stop portion abuts against the side of the sand guide plate 20 away from the sieving net 30 to generate a blocking force, which prevents the side of the sand guide plate 20 away from the sieving net 30 from slipping within the storage space 11.

Figure 5A:
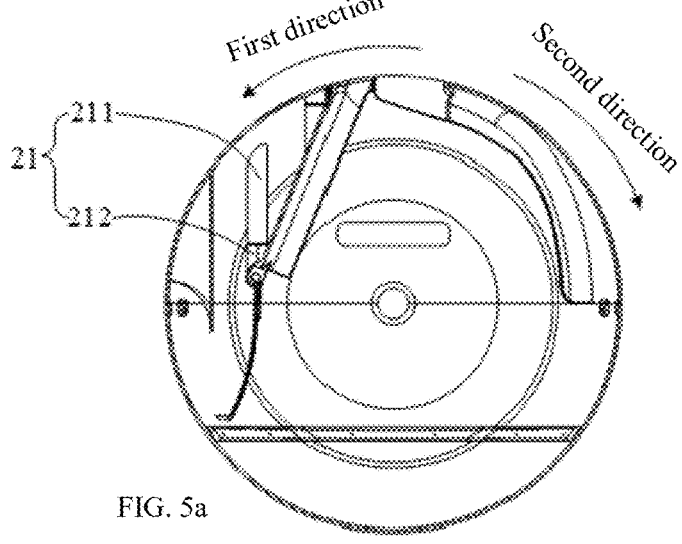
FIG. 5a shows an excretion state.
Figure 5B:
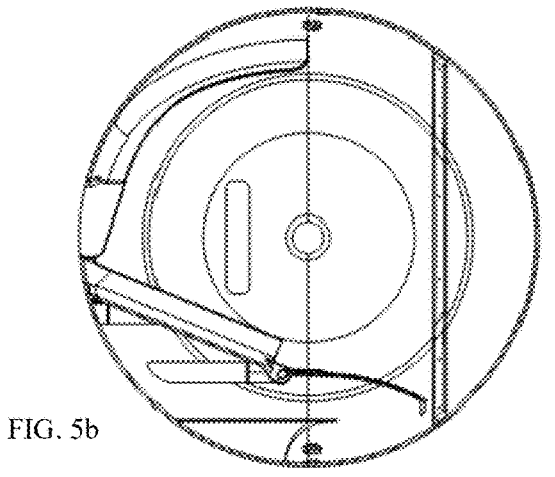
FIG. 5b shows one of the processes of a sieving state.
Figure 5C:
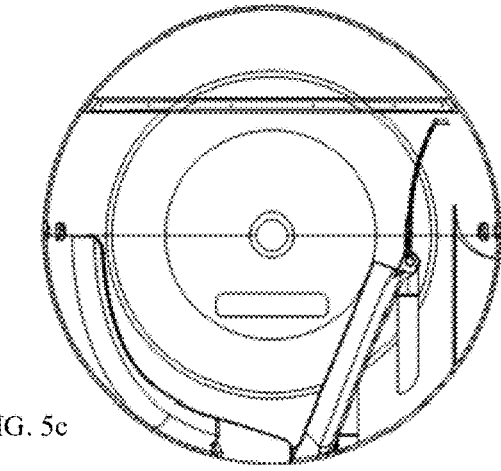
FIG. 5c shows one of the processes of the sieving state or a tipping state.

The cat litter sieving device 100 is arranged in a cat litter box 200 as a device for separating cat litter that has become entangled with cat's excrement from clean cat litter. The rotation direction of the cat litter sieving device 100 in a sieving mode is defined to be a first direction, and a second direction is a reverse direction of the first direction. It is understood that the cat litter sieving device 100 has at least two modes, namely an excretion mode and the sieving mode. Referring to FIG. 5a, when the cat litter sieving device 100 is in the excretion mode, an opening direction of the drain outlet 12 faces upward, in which case the cat can enter the storage space 11 to complete the excretion behavior. Referring to FIGS. 5a, 5b, and 5c, when the cat litter sieving device 100 is gradually rotated from the position in FIG. 5a to the positions in FIGS. 5b and 5c along the first direction, the cat litter sieving device 100 is in the sieving mode. Specifically, as the rotatable body 10 rotates, the position of the drain outlet 12 gradually moves downward until the drain outlet 12 is directed downward. During this process, the clean cat litter in the sieving cavity 112 enters the storage cavity 111 through the mesh of the sieving net 30; the cat litter entangled with the cat excrement rolls via the sand guide plate 20 to the drain outlet 12 until it is discharged from the cat litter sieving device 100.

The cat excrement may not have formed a sufficient clump with the cat litter due to the cat suffering from diarrhoea, the cat litter being of poor quality, or the cat litter being unsuitable. When the cat excrement passes over the sand guide plate 20, some of the cat excrement may remain on the sand guide plate 20, which creates a need to clean the sand guide plate 20. Considering that the drain outlet 12 is required to be inverted in order to discharge the cat litter entangled with the cat excrement, in order to ensure the proper functioning of the cat litter sieving device 100, the sand guide plate 20 and the sieving net 30 must remain relatively stationary with respect to the rotatable body 10. If the sand guide plate 20 is integrally arranged with the rotatable body 10, it is easy to form cleaning blind spots or hygiene dead ends, which in turn may cause odors or bacterial growth in the storage space 11. In the present embodiments, the sand guide plate 20 is removably connected to the rotatable body 10. The removable connection includes, but is not limited to, a snap fit or a magnetic connection. In this way, the user can remove the sand guide plate 20 and the sieving net 30 from the storage space 11 and clean the sand guide plate 20 and the sieving net 30 separately, which improves the cleaning effect. In addition, the inner wall of the storage space 11 is arranged with the stop portion, which may prevent the connection relationship with the rotatable body 10 from failing caused by that the sand guide plate 20 is affected by the gravity of the cat litter in the sand storage cavity 111 when the rotatable body 10 is rotated, and further prevent the sand guide plate 20 from slipping towards the sand sieving cavity 112 or the sand storage cavity 111 when the rotatable body 10 is rotated, thereby avoiding the situation where the clean cat litter that has entered the sand storage cavity 111 is mistakenly discharged from the drain outlet 12 during the sieving mode.

Figure 3:
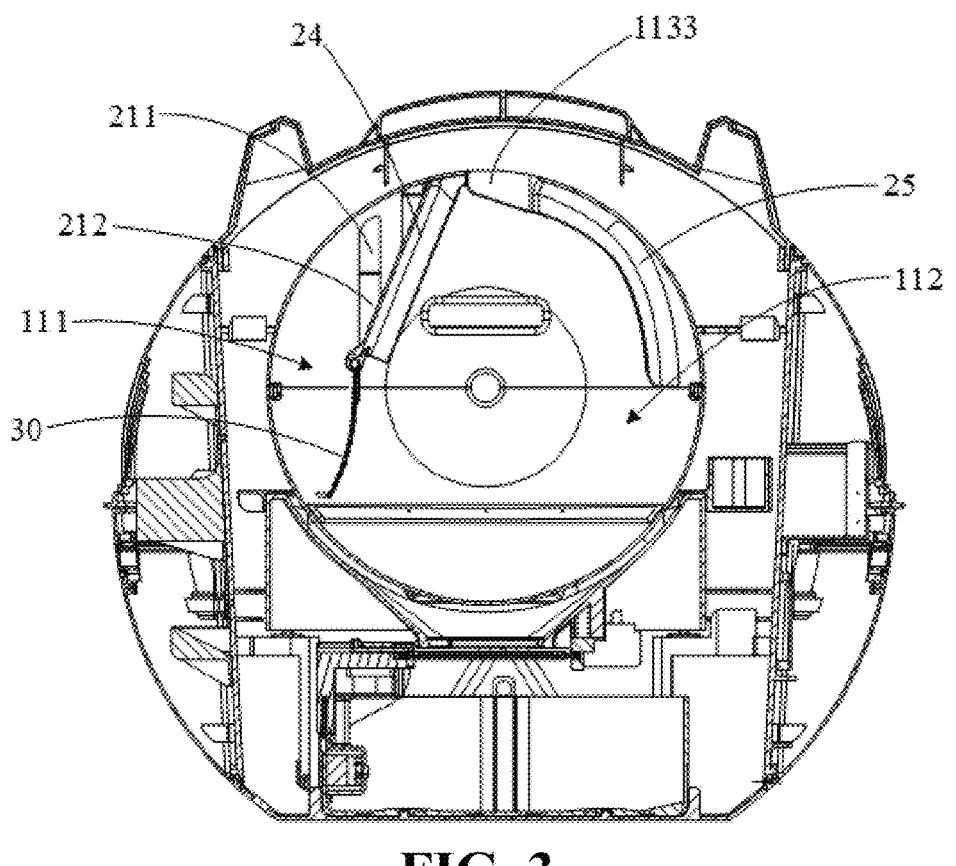
FIG. 3 is a cross-sectional schematic view of the cat litter box along line III-III in FIG. 2.
Figure 4:
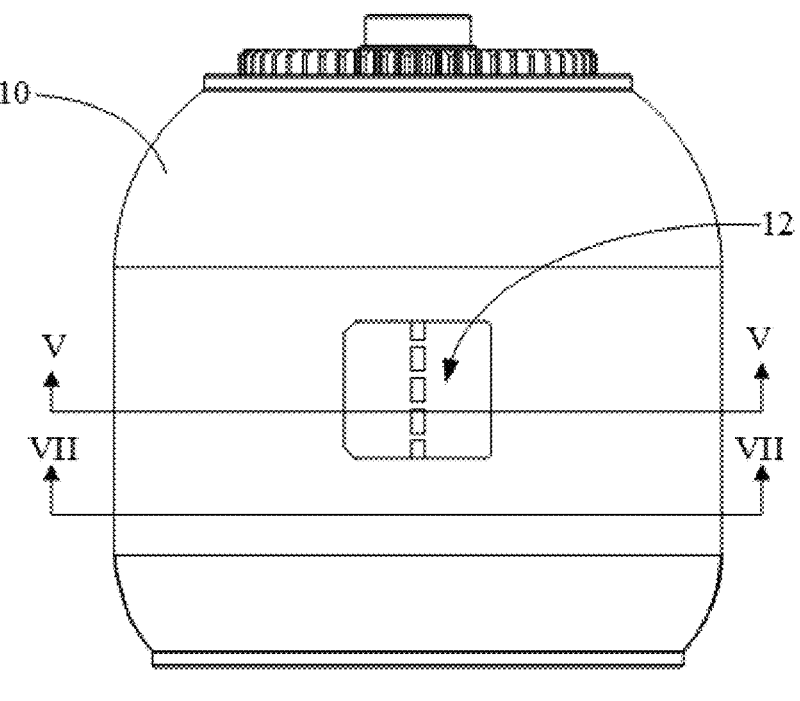
FIG. 4 is a top structural schematic view of a cat litter sieving device according to some embodiments of the present disclosure.
Figure 7:
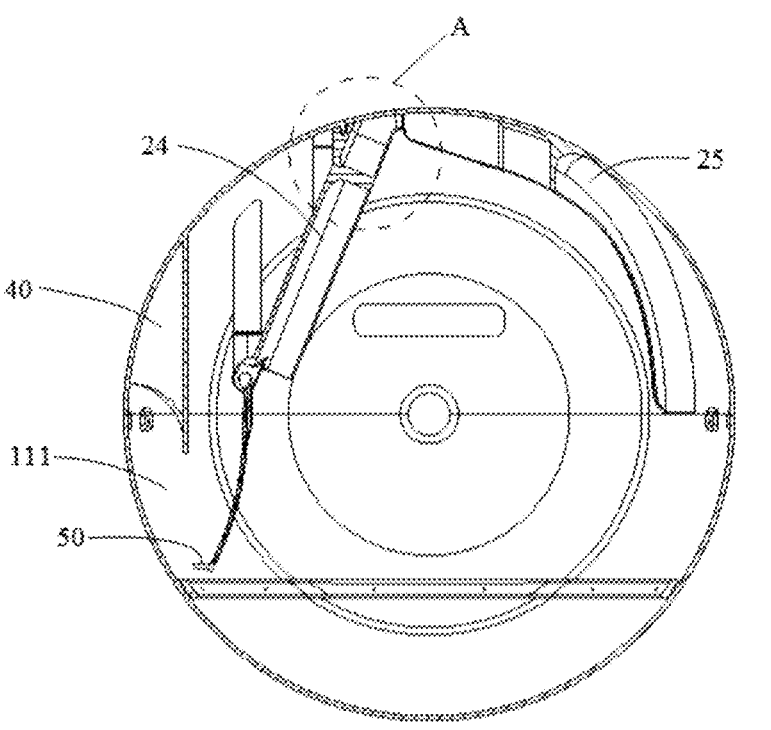
FIG. 7 is a cross-sectional schematic view of the cat litter sieving device along line VII-VII in FIG. 4.
Figure 15:
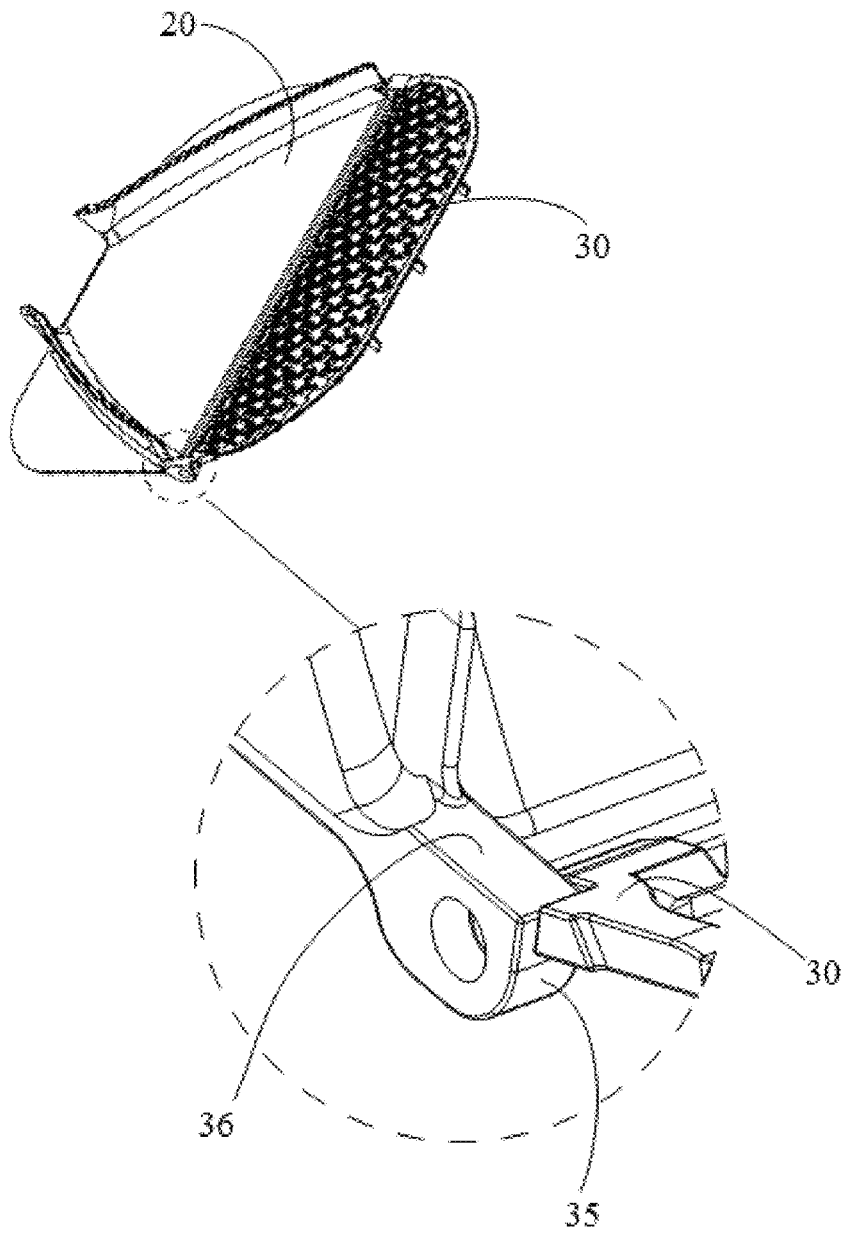
FIG. 15 is a structural schematic diagram of a connection method between a sand guide plate and a sieving net according to other embodiments of the present disclosure.

Referring to FIGS. 3, 5 and 7, in some embodiments, the sand guide plate 20 is rotatably connected to the sieving net 30. In some embodiments, referring to FIG. 15, an end of the sieving net 30 away from the sand guide plate 20 is arranged with a guide bevel 35 and a limit bevel 36, such that the sieving net 30 can only rotate towards the sand storage cavity 111 and cannot rotate towards the sand sieving cavity 112. The rotation of the sieving net 30 towards the sand storage cavity 111 facilitates the user in removing the sand guide plate 20 and the sand sieving net. When the user wishes to wash the sand guide plate 20 separately, the user can first rotate the sieving net 30 towards the sand storage cavity 111, such that the sieving net 30 and the sand guide plate 20 fold against each other, and then remove both from an entrance 60. In this way, the amount of sand stored in the storage cavity may be ensured, and it is convenient to remove the sand guide plate 20 and the sieving net 30 from the storage space 11 through the entrance 60. The reason for the sieving net 30 not being able to rotate towards the sand sieving cavity 112 is to prevent that the sieving net 30 has already rotated towards the sand sieving cavity 112 to fit against the sand guide plate 20 before the cat litter entangled with the cat excrement is discharged through the drain outlet 12, in a case where the cat litter sieving device 100 is in the sieving mode.

Figure 12:
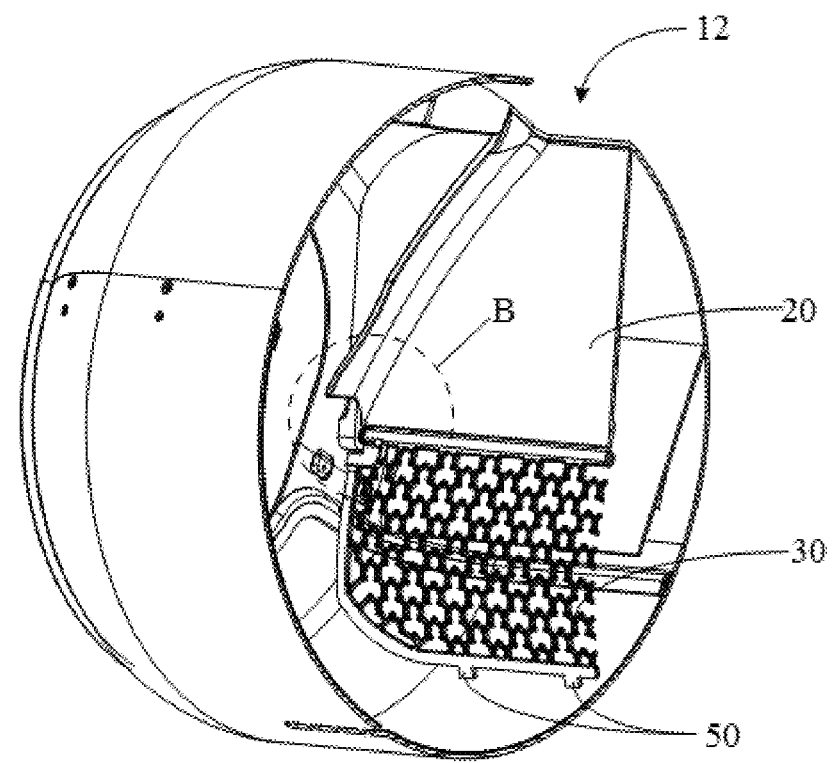
FIG. 12 is a cross-sectional schematic view of the cat litter sieving device along line XII-VXII in FIG. 11.
Figure 13:
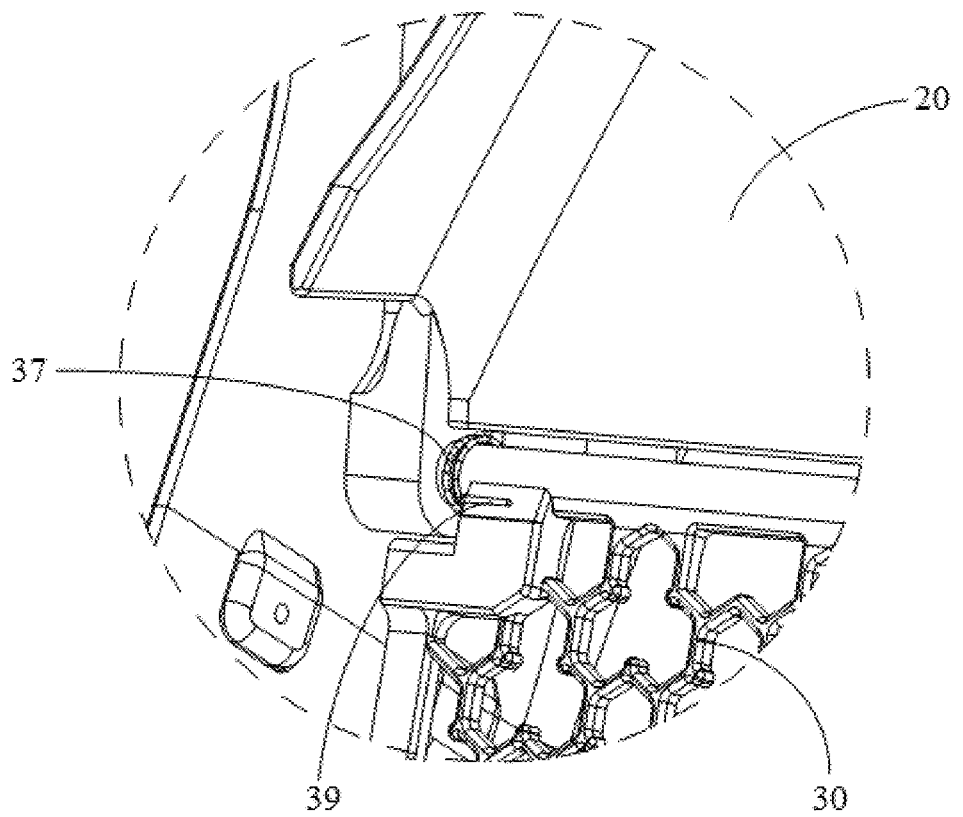
FIG. 13 is an enlarged view of area B in circumscribed FIG. 12.
Figure 14:
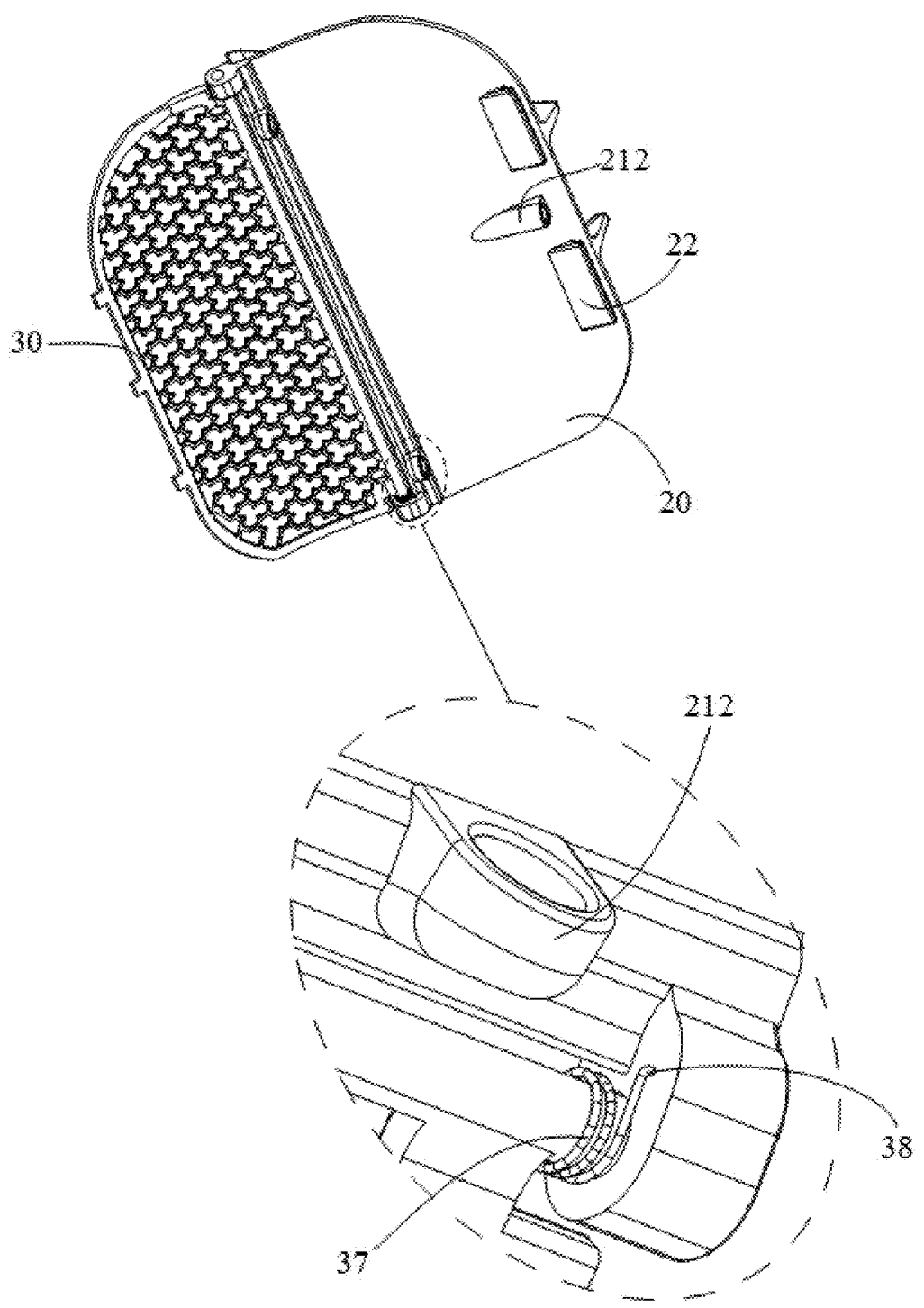
FIG. 14 is a structural schematic diagram of a connection method between a sand guide plate and a sieving net according to some embodiments of the present disclosure.

In some embodiments, referring to FIGS. 12 to 14, the sand guide plate 20 and the sieving net 30 are rotatably connected; a connection between the sand guide plate 20 and the sieving net 30 is arranged with a damping member 37. The damping member 37 includes, but is not limited to, a torque hinge, a torsion spring, etc. In some embodiments, the damping member 37 is a torsion spring. The torsion spring is sleeved on a rotating shaft of the sieving net 30; an end of the torsion spring is arranged with a first limit leg 38, and another end of the torsion spring is arranged with a second limit leg 39, the first limit leg 38 and the second limit leg 39 extending in opposite directions; the first limit leg 38 is connected to a side of the sand guide plate 20 close to the sieving net 30, and the second limit leg 39 is lapped and connected to a side of the sieving net 30 facing the sand storage cavity 111. The torsion spring limits the rotation angle of the sieving net 30. The sieving net 30 can then rotate freely towards the sand storage cavity 111, which makes it easier for the user to fold the sand guide plate 20 and sieving net 30 and remove them for cleaning. As the second limit leg 39 is lapped and connected to the side of the sieving net 30 facing the sand storage cavity 111, the sieving net 30 can only rotate towards the sand storage cavity 112 within a certain angle, which prevents that the sieving net 30 has already rotated towards the sand sieving cavity 112 to fit against the sand guide plate 20 before the cat litter entangled with the cat excrement is discharged through the drain outlet 12, in a case where the cat litter sieving device 100 is in the sieving mode, and further increases the sieving speed of the cat litter.

In some embodiments, the sieving net 30 is arranged with multiple rake teeth 50 on a side away from the sand guide plate 20, and the multiple rake teeth 50 are arranged at intervals along a peripheral edge of the sieving net 30. The rake teeth 50 may increase the sieving speed of the cat litter. If the rake teeth 50 are not present, when the amount of cat litter in the sand sieving cavity 112 is too large and the cat litter sieving device 100 is in the sieving mode, the clean cat litter that cannot enter the sand storage cavity 111 in time may be discharged along the sand guide plate 20 via the drain outlet 12. In some embodiments, referring to FIG. 7, the rake teeth 50 are angled with respect to the sieving net 30 and extend towards the storage cavity 111 to abut against the inner wall of the storage cavity 111. In some embodiments, referring to FIGS. 12 and 14, the rake teeth 50 are flush with the sieving net 30.

In some embodiments, the stop portion includes a stop protrusion 1131 disposed on the inner wall of the sand storage cavity 111; the sand guide plate 20 defines a stop groove 1132 on the side away from the sieving net 30, and the stop protrusion 1131 is engaged with the stop groove 1132.

When the cat litter sieving device 100 is in the sieving mode, the clean cat litter enters the sand storage cavity 111 through the sieving net 30. In this case, the sand guide plate 20 is affected by the gravity of the cat litter in the sand storage cavity 111 and tends to move towards the drain outlet 12. If the sand guide plate 20 moves and blocks the drain outlet 12, the clean cat litter entering the sand storage cavity 111 will be discharged through the drain outlet 12, which may result in wastage. In the present embodiments, the stop protrusion 1131 and the stop groove 1132 engage to produce a blocking force, such that the sand guide plate 20 cannot be displaced under the influence of the cat litter.

Furthermore, the sand guide plate 20 is arranged with at least two stop seats 22, each of which forms a corresponding stop groove 1132; the side of the sand guide plate 20 away from the sieving net 30 is further arranged with a reinforcing rib 23, which is disposed between each adjacent two of the at least two stop seats 22.

Figure 10:
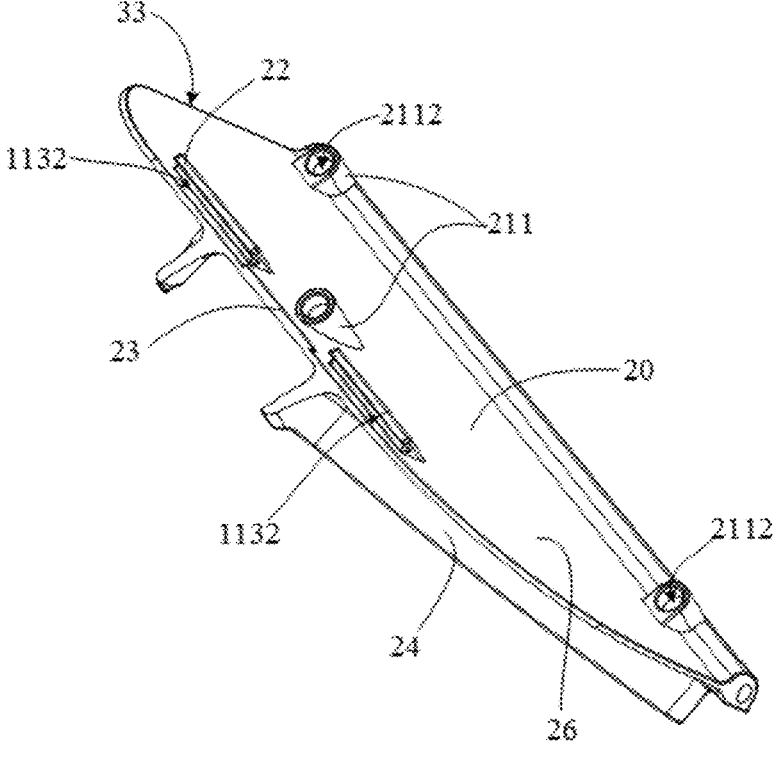
FIG. 10 is a structural schematic view of a sand guide plate in FIG. 4.
Figure 11:
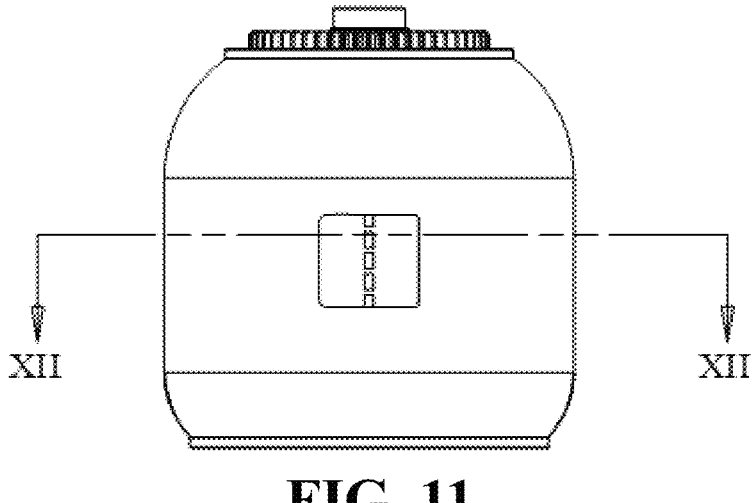
FIG. 11 is a top structural schematic view of a cat litter sieving device according to other embodiments of the present disclosure.

The stop seat 22 may strengthen the structural strength of the sand guide plate 20 to prevent the sand guide plate 20 from being displaced or deformed under the action of the cat litter in the sand storage cavity 111. The structural strength of the sand guide plate 20 in an area between the adjacent two stop seats 22 is relatively weak. Referring to FIG. 10, in the embodiments, the structural strength of the corresponding position on the sand guide plate 20 is enhanced by the reinforcing rib 23 between the adjacent two stop seats 22, such that the sand guide plate 20 as a whole is not prone to displacement or deformation. In some embodiments, the stop seat 22 is arranged close to the drain outlet 12, which may lower the center of gravity of sand guide plate 20, such that the sand guide plate 20 cannot be easily displaced.

In some embodiments, the stop portion includes a limit protrusion 1133 arranged along an edge of the drain outlet 12 and in the sand storage cavity 111: a side edge of the sand guide plate 20 abuts against the limit protrusion 1133.

Further, the drain outlet 12 has two first edges 31 and a second edge 32 connecting the two first edges 31; each of the two first edges 31 is arranged with a corresponding limit protrusion 1133; the sand guide plate 20 includes a main plate 26 and two guide walls 24, the main plate 26 having two first side edges 33 and a second side edge 34 connecting the two first side edges 33; the two guide walls 24 are connected to the two first side edges 33 in a one-to-one correspondence and are bent towards the sand sieving cavity 112; the second side edge 34 is close to and parallel to the second edge 32; the two guide walls 24 abut against the limit protrusions 1133 on the two first edges 31 in a one-to-one correspondence.

The guide walls 24 have the function of guiding the cat litter entangled with the cat excrement to the drain outlet 12. Referring to FIG. 5, the rotation direction of the cat litter sieving device 100 in the sieving mode is the first direction, and the second direction is a reverse direction of the first direction. The cat litter that enters the storage cavity 111 is likely to be contaminated with cat excrement, which creates a need to empty this type of cat litter. In some embodiments, the cat litter separating device 100 is further configured with a tipping mode. The process of rotating in the second direction from FIG. 5a to FIG. 5b is the tipping mode. Specifically, the rotatable body 10 is caused to rotate in the second direction gradually until the opening direction of the drain outlet 12 faces down, and the cat litter in the sand sieving cavity 112 can slide along the inner wall or a baffle 25 of the sand sieving cavity 112 and then be discharged through the drain outlet 12. The two guide walls 24 abut against the limit protrusions 1133 on the two first edges 31 in a one-to-one correspondence, such that in any mode, the limit protrusions 1133 can restrict the movement of the sand guide plate 20 towards the drain outlet 12.

In some embodiments, a support portion 21 is arranged between the sand guide plate 20 and the rotatable body 10, and the support portion 21 is disposed in the sand storage cavity 111.

Referring to FIG. 5a, in the excretion mode, the support portion 21 may balance the gravity of the sand guide plate 20 to prevent the sand guide plate 20 from moving downward relative to the rotatable body 10. Referring to FIGS. 5b and 5c, in the sieving mode, the support portion 21 may balance the gravity the cat litter in the sand storage cavity 111 and part of the gravity of the sand guide plate 20 to prevent the sand guide plate 20 from deviating from a preset position, thereby preventing the cat litter sieving device 100 from functioning abnormally.

Further, the support portion 21 includes a first support column 211 disposed on the inner wall of the sand storage cavity 111 and a second support column 212 disposed on the sand guide plate 20: the first support column 211 is arranged with a first magnetic member, and the second support column 212 is arranged with a second magnetic member, and the first magnetic member and the second magnetic member can be magnetically connected.

If the first support column 211 and the second support column 212 are snapped together, not only does this increase the difficulty of design and manufacture, it also makes use and maintenance more difficult. Specifically: the structural strength of the inner wall of the sand storage cavity 111 and the stability of the snap-fit position need to be fully considered during design and production. Since the sand guide plate 20 is arranged in the storage space 11, and considering that the volume of the storage space 11 is limited, the size of the snap-fit structure is also relatively limited, which requires that the user must be fully familiar with the installation and removal of the snap-fit. If the force is not applied properly or the removal method is incorrect, the snap-fit structure is likely to be damaged. In the present embodiments, when designing and manufacturing, the manufacturer only needs to consider whether the magnitude of the magnetic force meets the requirements. When in use, referring to FIG. 1, the user only needs to grasp a side of the sand guide plate 20 near the entrance 60 and separate the first support column 211 and the second support column 212 from each other in either direction.

In some embodiments, referring to FIGS. 5 and 10, a first mounting slot 2112 is defined on an end of the first support column 211 close to the second support column 212, and a second mounting slot is defined on an end of the second support column 212 close to the first support column 211. The first magnetic member and the second magnetic member are accommodated in the first mounting slot 2112 and the second mounting slot, respectively. In some embodiments, as shown in FIGS. 5 and 10, the support portion 21 has a triangular structure, which allows the support portion 21 to more securely support the sand guide plate 20.

Further, the extension directions of the first support column 211 and the second support column 212 are parallel to the opening direction of the drain outlet 12, and the length of the second support column 212 is less than the length of the first support column 211.

When the extension directions of the first support column 211 and the second support column 212 are not parallel to the opening direction of the drain outlet 12, in the excretion mode, the vertical component of the magnetic force between the first magnetic member and the second magnetic member is greater than or equal to the gravity of the sand guide plate 20 and the sieving net 30, such that the sand guide plate 20 maintains a connected relationship with the inner wall of the rotatable body 10. When the extension directions of the first support column 211 and the second support column 212 are parallel to the opening direction of the drain outlet 12, in the excretion mode, the magnetic force between the first magnetic member and the second magnetic member is greater than or equal to the gravity of the sand guide plate 20 and the sieving net 30, which can maintain the connection between the sand guide plate 20 and the inner wall of the rotatable body 10, thereby avoiding the displacement of the sand guide plate 20 relative to the rotatable body 10. The design proposed in the present embodiments may reduce the requirements for the first magnetic member and the second magnetic member, and thus reduce manufacturing costs.

Figure 8:
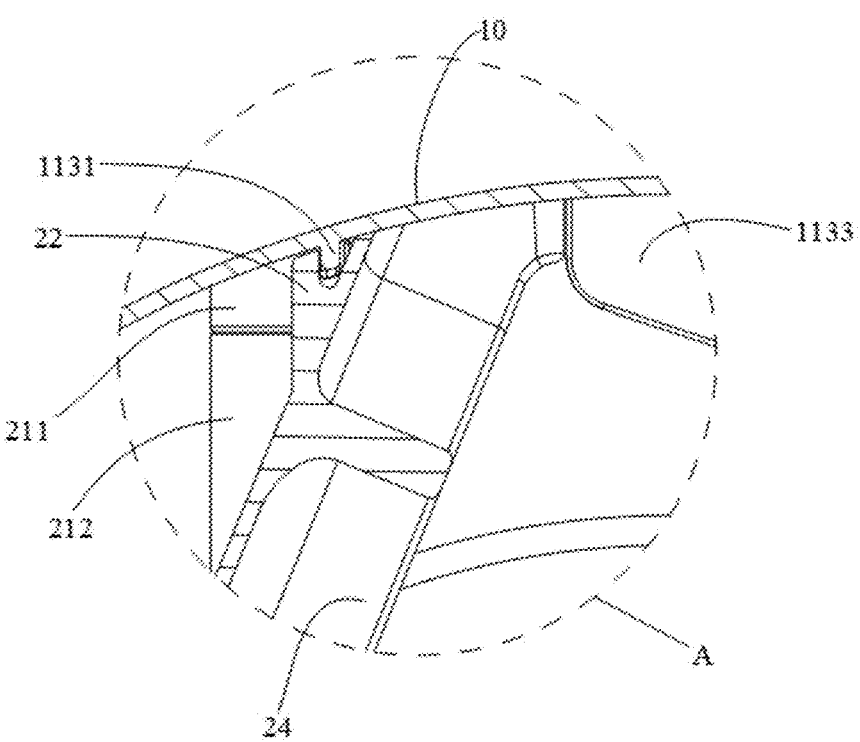
FIG. 8 is an enlarged view of area A circumscribed in FIG. 7.

Cats like to scratch and dig after they have defecated. In the excretion state, the sand guide plate 20 may separate from the inner wall of the rotatable body 10 due to the cat scratching and digging at the sieving net 30. Due to the limited storage space 11, this may cause the sand guide plate 20 to hit the cat, resulting in injury: or the cat being startled. Assuming that the cat's force is the same, if the length of the first support column 211 is equal to or longer than the length of the second support column 212, the lever arm is larger, and thus the moment is larger, and the second support column 212 is prone to a rotation effect. While in the present embodiments, with reference to FIGS. 3, 7, and 8, the length of the first support column 211 is less than the length of the second support column 212, in which case the lever arm is smaller, and thus the moment is smaller, and thus the second support column 212 is relatively not prone to a rotation effect.

In some embodiments, the rotatable body 10 has a sieving state and a reference line. In the sieving state, the drain outlet 12 is disposed at the bottom of the rotatable body 10, and the reference line passes through a connection between the sand guide plate 20 and the sieving net 30 and extends in a horizontal direction. The cat litter sieving device 100 further includes a sand storage tank 40 arranged in the sand storage cavity 111. In the sieving state, the sand storage tank 40 is disposed at least partially above the reference line, and an opening of the sand storage tank 40 is disposed above the reference line.

Figure 6:
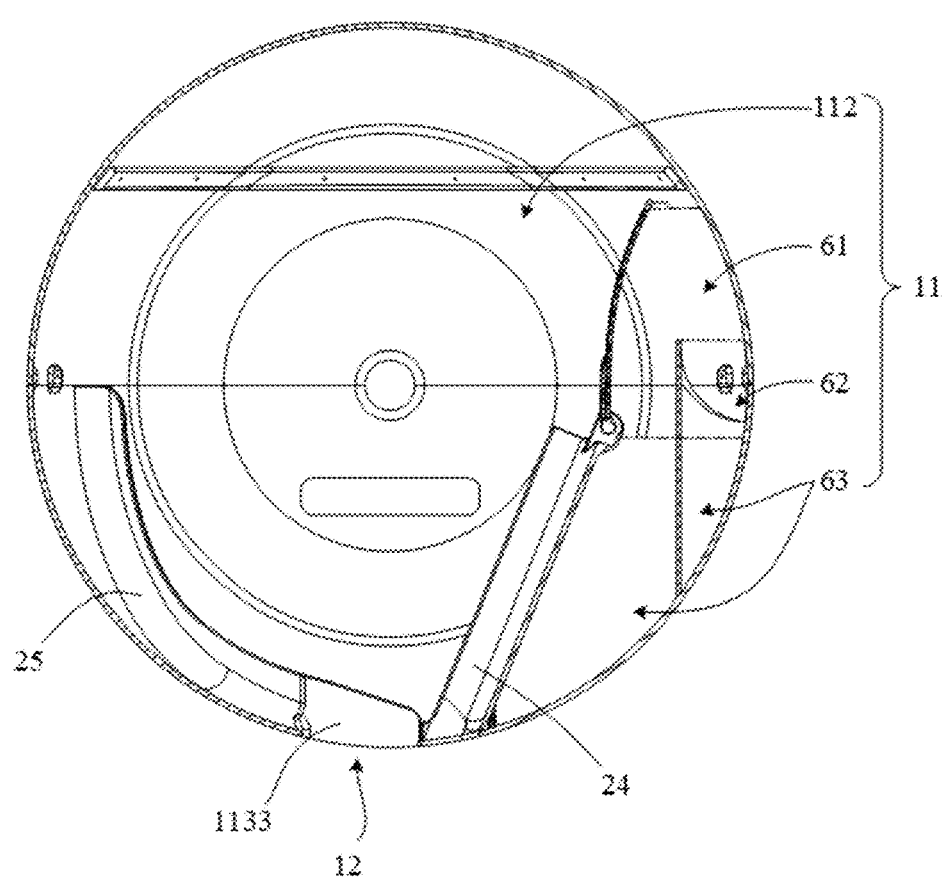
FIG. 6 is an allocation diagram of space shown in FIG. 5.

Referring to FIGS. 5 and 6, the sand storage cavity 111 includes a first space 61, a second space 62, and a third space 63.

When the rotatable body 10 is in the sieving state and the drain outlet 12 is disposed at the bottom of the rotatable body 10, the second space 62 and the first space 61 are spaces of the sand storage cavity 111 above the reference line in the sieving state, and they serve as temporary spaces for the clean cat litter to enter and exit the sand storage cavity 111; the third space 63 is a space of the sand storage cavity 111 below the reference line in the sieving state, and serve as an actual storage space of the sand storage cavity 111. In this case, the space of the sand storage cavity 111 is limited, and the user needs to frequently replace the cat litter. Referring to FIG. 6, in some embodiments, due to the presence of the sand storage tank 40, the second space 62 can store cat litter. The second space 62 is a space of the sand storage tank above the reference line, such that the actual storage space of the sand storage cavity 111 is increased, and the user does not need to frequently add cat litter to the storage space 11.

Figure 9:
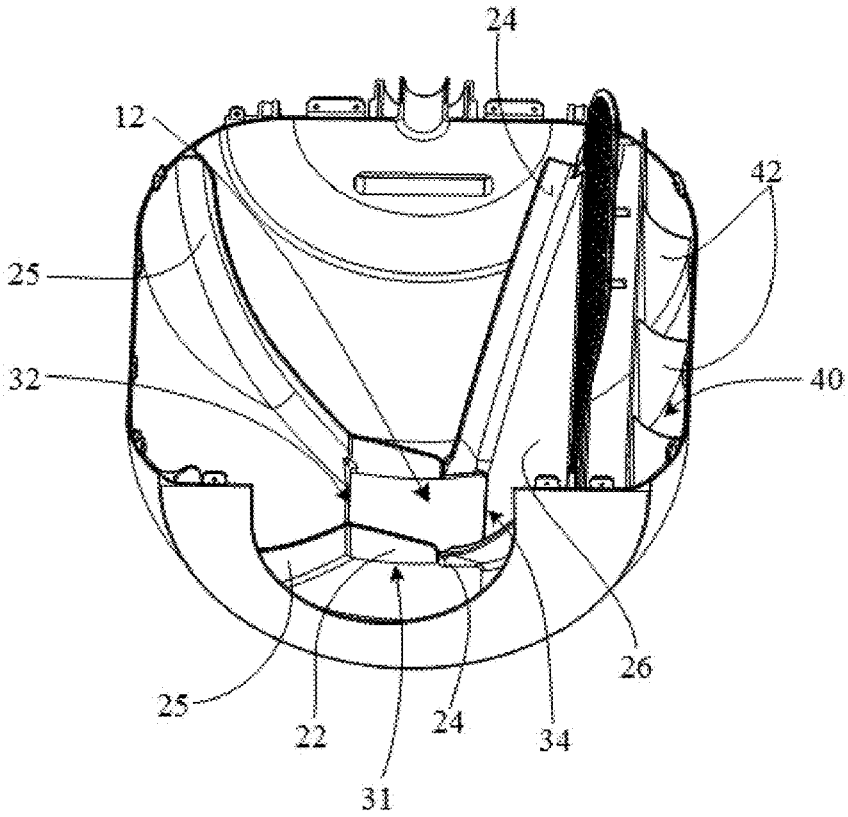
FIG. 9 is a schematic view of a partial structure of the cat litter sieving device in FIG. 4.

In some embodiments, referring to FIG. 9, multiple reinforcing bars 42 are arranged in the sand storage tank 40 and distributed at intervals along a rotation axis of the rotatable body 10, and the reinforcing bars 42 extend along a lateral direction and are connected to the inner wall of the sand storage tank 40. The reinforcing bars 42 may increase the structural strength of the inner wall of the sand storage tank 40 and prevent the sand storage tank 40 from being severely deformed by the gravity of the cat litter. In some embodiments, a side wall of the sand storage tank 40 opposite the inner wall of the sand storage cavity 111 extends in the direction of the rotation axis of the rotatable body 10 to abut against the inner wall of the rotatable body 10, which may increase the space of the sand storage tank 40 to increase the storage capacity of the cat litter.

The present disclosure further proposes a cat litter box 200, with reference to FIGS. 1 to 10, the cat litter box 200 including a body portion 70 and a cat litter sieving device 100, the specific structure of the cat litter sieving device 100 being referred to in the above embodiments. Since the cat litter box 200 adopts all the technical solutions of all the above embodiments, it has at least all the beneficial effects brought about by the technical solutions of the above embodiments, which will not be described in detail herein. In particular, the body portion 70 of the cat litter box 200 may keep the cat litter sieving device 100 stationary on the bottom surface in the excretion mode, thereby facilitating the cat's entry and exit into the storage space 11 to complete the excretion behavior. In addition, the body portion 70 of the cat litter box 200 may further control the rotation of the cat litter sieving device 100, such that the cat litter sieving device 100 can switch between modes such as excretion mode and sieving mode, which may increase the degree of automation of the cat litter box 200, making it more convenient to use.

In the above. "downward" refers to the direction of gravity of the cat litter sieving device 100, and "upward" refers to the direction opposite to the direction of gravity.

Finally, it should be noted that the above embodiments are only intended to illustrate the technical solution of the present disclosure, not to limit it. Although the present disclosure has been described in detail with reference to the foregoing embodiments, those skilled in the art will understand that the technical solutions recorded in the foregoing embodiments can be modified, or some of the technical features can be replaced by equivalents; and these modifications or replacements do not drive the essence of the corresponding technical solution out of the spirit and scope of the technical solutions of the embodiments of the present disclosure.

What is claimed is:

1. A cat litter sieving device, comprising:
   a rotatable body,
   a sand guide plate, and
   a sieving net; wherein the rotatable body defines a storage space and a drain outlet communicating with the storage space; the sand guide plate and the sieving net are connected to each other, cooperatively dividing the storage space into a sand storage cavity and a sand sieving cavity; the drain outlet is arranged on the sand sieving cavity, and the sieving net has a mesh structure;
   the sand guide plate is removably connected to the rotatable body; a side of the sand guide plate away from the sieving net is disposed to face the drain outlet; a stop portion is arranged on an inner wall of the storage space, and the stop portion abuts against the side of the sand guide plate away from the sieving net to generate a blocking force, for preventing the side of the sand guide plate away from the sieving net from slipping within the storage space;
   wherein the sieving net is rotatably connected to the sand guide plate; a connection between the sand guide plate and the sieving net is arranged with a damping member; an end of the sieving net away from the sand guide plate is arranged with a guide bevel and a limit bevel, such that the sieving net is only capable of rotating towards the sand storage cavity and is not capable of rotating towards the sand sieving cavity.

2. The cat litter sieving device according to claim 1, wherein the stop portion comprises a stop protrusion disposed on an inner wall of the sand storage cavity; the sand guide plate defines a stop groove on the side away from the sieving net, and the stop protrusion is engaged with the stop groove.

3. The cat litter sieving device according to claim 2, wherein the sand guide plate is arranged with at least two stop seats, and each of the at least two stop seats defines the stop groove;

the side of the sand guide plate away from the sieving net is further arranged with a reinforcing rib disposed between each adjacent two of the at least two stop seats.

4. The cat litter sieving device according to claim 1, wherein the stop portion comprises a limit protrusion arranged in the sand storage cavity; the drain outlet has two first edges and a second edge connecting the two first edges; each of the two first edges is arranged with the limit protrusion;

the sand guide plate comprises a main plate and two guide walls, the main plate having two first side edges and a second side edge connecting the two first side edges; the two guide walls are connected to the two first side edges in a one-to-one correspondence and are bent towards the sand sieving cavity; the second side edge faces and is parallel to the second edge;

the two guide walls abut against the limit protrusions on the two first edges in a one-to-one correspondence.

5. The cat litter sieving device according to claim 1, wherein a support portion is arranged between the sand guide plate and the rotatable body, and the support portion is disposed in the sand storage cavity, wherein the support portion is configured to balance a gravity of a cat litter in the sand storage cavity and a gravity of the sand guide plate.

6. The cat litter sieving device according to claim 5, wherein the support portion comprises a first support column disposed on an inner wall of the sand storage cavity and a second support column disposed on the sand guide plate;

the first support column is arranged with a first magnetic member, and the second support column is arranged with a second magnetic member, the first magnetic member and the second magnetic member being capable of magnetically connected to each other.

7. The cat litter sieving device according to claim 6, wherein extension directions of the first support column and the second support column are parallel to an opening direction of the drain outlet, and a length of the second support column is less than a length of the first support column.

8. The cat litter sieving device according to claim 1, wherein the rotatable body has a sieving state and a reference line; in the sieving state, the drain outlet is disposed at a bottom of the rotatable body, and the reference line passes through a connection between the sand guide plate and the sieving net and extends in a horizontal direction;

the cat litter sieving device further comprises a sand storage tank arranged in the sand storage cavity; in the sieving state, and an opening of the sand storage tank is disposed above the reference line.

9. The cat litter sieving device according to claim 8, wherein multiple reinforcing bars are arranged in the sand storage tank and distributed at intervals along a rotation axis of the rotatable body, and the reinforcing bars extend along a lateral direction and are connected to an inner wall of the sand storage tank.

10. A cat litter box, comprising a body portion and the cat litter sieving device of claim 1; wherein the body portion is rotatably connected to the cat litter sieving device.

11. The cat litter box according to claim 10, wherein the stop portion comprises a stop protrusion disposed on an inner wall of the sand storage cavity; the sand guide plate defines a stop groove on the side away from the sieving net, and the stop protrusion is engaged with the stop groove.

12. The cat litter box according to claim 10, wherein a support portion is arranged between the sand guide plate and the rotatable body, and the support portion is disposed in the sand storage cavity, wherein the support portion is configured to balance a gravity of a cat litter in the sand storage cavity and a gravity of the sand guide plate.

13. The cat litter box according to claim 12, wherein the support portion comprises a first support column disposed on an inner wall of the sand storage cavity and a second support column disposed on the sand guide plate;

the first support column is arranged with a first magnetic member, and the second support column is arranged with a second magnetic member, the first magnetic member and the second magnetic member being capable of magnetically connected to each other.

14. The cat litter box according to claim 13, wherein extension directions of the first support column and the second support column are parallel to an opening direction of the drain outlet, and a length of the second support column is less than a length of the first support column.

15. The cat litter box according to claim 10, wherein the rotatable body has a sieving state and a reference line; in the sieving state, the drain outlet is disposed at a bottom of the rotatable body, and the reference line passes through a connection between the sand guide plate and the sieving net and extends in a horizontal direction;

the cat litter sieving device further comprises a sand storage tank arranged in the sand storage cavity; in the sieving state, and an opening of the sand storage tank is disposed above the reference line.

16. The cat litter box according to claim 10, wherein the sieving net is rotatably connected to the sand guide plate; a connection between the sand guide plate and the sieving net is arranged with a damping member; an end of the sieving net away from the sand guide plate is arranged with a guide bevel and a limit bevel, such that the sieving net is only capable of rotating towards the sand storage cavity and is not capable of rotating towards the sand sieving cavity.

17. The cat litter sieving device according to claim 1, wherein the sieving net is arranged with multiple rake teeth on a side away from the sand guide plate, and the multiple rake teeth are arranged at intervals along a peripheral edge of the sieving net.

18. A cat litter sieving device, comprising:

a rotatable body, a sand guide plate, and a sieving net; wherein the rotatable body defines a storage space and a drain outlet communicating with the storage space; the sand guide plate and the sieving net are connected to each other, cooperatively dividing the storage space into a sand storage cavity and a sand sieving cavity; the drain outlet is arranged on the sand sieving cavity, and the sieving net has a mesh structure;

the sand guide plate is removably connected to the rotatable body; a side of the sand guide plate away from the sieving net is disposed to face the drain outlet; a stop portion is arranged on an inner wall of the storage space, and the stop portion abuts against the side of the sand guide plate away from the sieving net to generate a blocking force, for preventing the side of the sand guide plate away from the sieving net from slipping within the storage space;

wherein the stop portion comprises a stop protrusion disposed on an inner wall of the sand storage cavity; the sand guide plate defines a stop groove on the side away from the sieving net, and the stop protrusion is engaged with the stop groove;

wherein the sand guide plate is arranged with at least two stop seats, and each of the at least two stop seats defines the stop groove; the side of the sand guide plate away from the sieving net is further arranged with a reinforcing rib disposed between each adjacent two of the at least two stop seats.

19. A cat litter sieving device, comprising:

a rotatable body, a sand guide plate, and a sieving net; wherein the rotatable body defines a storage space and a drain outlet communicating with the storage space; the sand guide plate and the sieving net are connected to each other, cooperatively dividing the storage space into a sand storage cavity and a sand sieving cavity; the drain outlet is arranged on the sand sieving cavity, and the sieving net has a mesh structure;

the sand guide plate is removably connected to the rotatable body; a side of the sand guide plate away from the sieving net is disposed to face the drain outlet; a stop portion is arranged on an inner wall of the storage space, and the stop portion abuts against the side of the sand guide plate away from the sieving net to generate a blocking force, for preventing the side of the sand guide plate away from the sieving net from slipping within the storage space;

wherein the stop portion comprises a limit protrusion arranged in the sand storage cavity; the drain outlet has two first edges and a second edge connecting the two first edges; each of the two first edges is arranged with the limit protrusion; the sand guide plate comprises a main plate and two guide walls, the main plate having two first side edges and a second side edge connecting the two first side edges; the two guide walls are connected to the two first side edges in a one-to-one correspondence and are bent towards the sand sieving cavity; the second side edge faces and is parallel to the second edge; the two guide walls abut against the limit protrusions on the two first edges in a one-to-one correspondence.

\* \* \* \* \*